(12) United States Patent
Fernald et al.

(10) Patent No.: US 9,833,763 B2
(45) Date of Patent: Dec. 5, 2017

(54) OPTIMIZING ACOUSTIC EFFICIENCY OF A SONIC FILTER OR SEPARATOR

(75) Inventors: Mark R. Fernald, Enfield, CT (US); Timothy J. Bailey, Longmeadow, MA (US)

(73) Assignee: CiDRA CORPORATE SERVICES, INC., Wallingford, CT (US)

( * ) Notice: Subject to any disclaimer, the term of this patent is extended or adjusted under 35 U.S.C. 154(b) by 121 days.

(21) Appl. No.: 13/983,398

(22) PCT Filed: Feb. 6, 2012

(86) PCT No.: PCT/US2012/023960
§ 371 (c)(1),
(2), (4) Date: Oct. 21, 2013

(87) PCT Pub. No.: WO2012/154237
PCT Pub. Date: Nov. 15, 2012

(65) Prior Publication Data
US 2014/0301902 A1    Oct. 9, 2014

Related U.S. Application Data

(60) Provisional application No. 61/439,540, filed on Feb. 4, 2011.

(51) Int. Cl.
*B01J 19/10* (2006.01)
*G01F 23/296* (2006.01)
*B03D 1/02* (2006.01)

(52) U.S. Cl.
CPC .......... *B01J 19/10* (2013.01); *G01F 23/2961* (2013.01); *G01F 23/2967* (2013.01); *B01J 2219/0877* (2013.01); *B03D 1/028* (2013.01)

(58) Field of Classification Search
CPC ...... A61L 2/025; B01J 19/10; G01F 23/2961; G01F 23/2967
See application file for complete search history.

(56) References Cited

U.S. PATENT DOCUMENTS

| 3,220,258 A | 11/1965 | Rod | |
|---|---|---|---|
| 4,144,517 A * | 3/1979 | Baumoel | G01F 23/2961 367/93 |
| 4,145,917 A * | 3/1979 | Brazhnikov et al. | 73/64.53 |
| 4,203,324 A * | 5/1980 | Baumoel | G01F 23/2961 367/908 |
| 4,580,448 A | 4/1986 | Skrgatic | |

(Continued)

*Primary Examiner* — Regina M Yoo
(74) *Attorney, Agent, or Firm* — Ware, Fressola, Maguire & Barber LLP

(57) ABSTRACT

Apparatus features a container and a transducer. The container is made of a selected material and has a container wall with a selected thickness, and configured to hold a fluid therein. The transducer is configured on the outside of the container wall, and is also configured to provide a standing wave into the fluid. The selected thickness and material of the container wall is chosen to ensure about a ½ wavelength of a desired frequency exists within the container wall, so as to substantially reduce back reflections toward the transducer due to any mismatch in acoustic impedance at the interface between the container wall and the fluid, and so as to substantially maximize the amount of energy delivered to the fluid, thus improving the operating efficiency of the apparatus.

2 Claims, 1 Drawing Sheet

(56) References Cited

U.S. PATENT DOCUMENTS

| | | | |
|---|---|---|---|
| 4,770,038 A | | 9/1988 | Zuckerwar et al. |
| 5,793,705 A | * | 8/1998 | Gazis et al. ............... 367/98 |
| 6,397,656 B1 | | 6/2002 | Yamaguchi et al. |
| 6,936,151 B1 | | 8/2005 | Lock et al. |
| 7,134,320 B2 | | 11/2006 | Gysling et al. |
| 7,165,464 B2 | | 1/2007 | Gysling et al. |
| 7,343,820 B2 | | 3/2008 | Gysling et al. |
| 7,363,800 B2 | | 4/2008 | Gysling |
| 7,367,240 B2 | | 5/2008 | Gysling et al. |
| 2004/0173021 A1 | | 9/2004 | Lizon et al. |
| 2004/0251780 A1 | * | 12/2004 | Goodson ............... 310/323.18 |
| 2010/0264095 A1 | | 10/2010 | Hadfield et al. |
| 2010/0323342 A1 | | 12/2010 | Gonzalez Gomez et al. |

\* cited by examiner

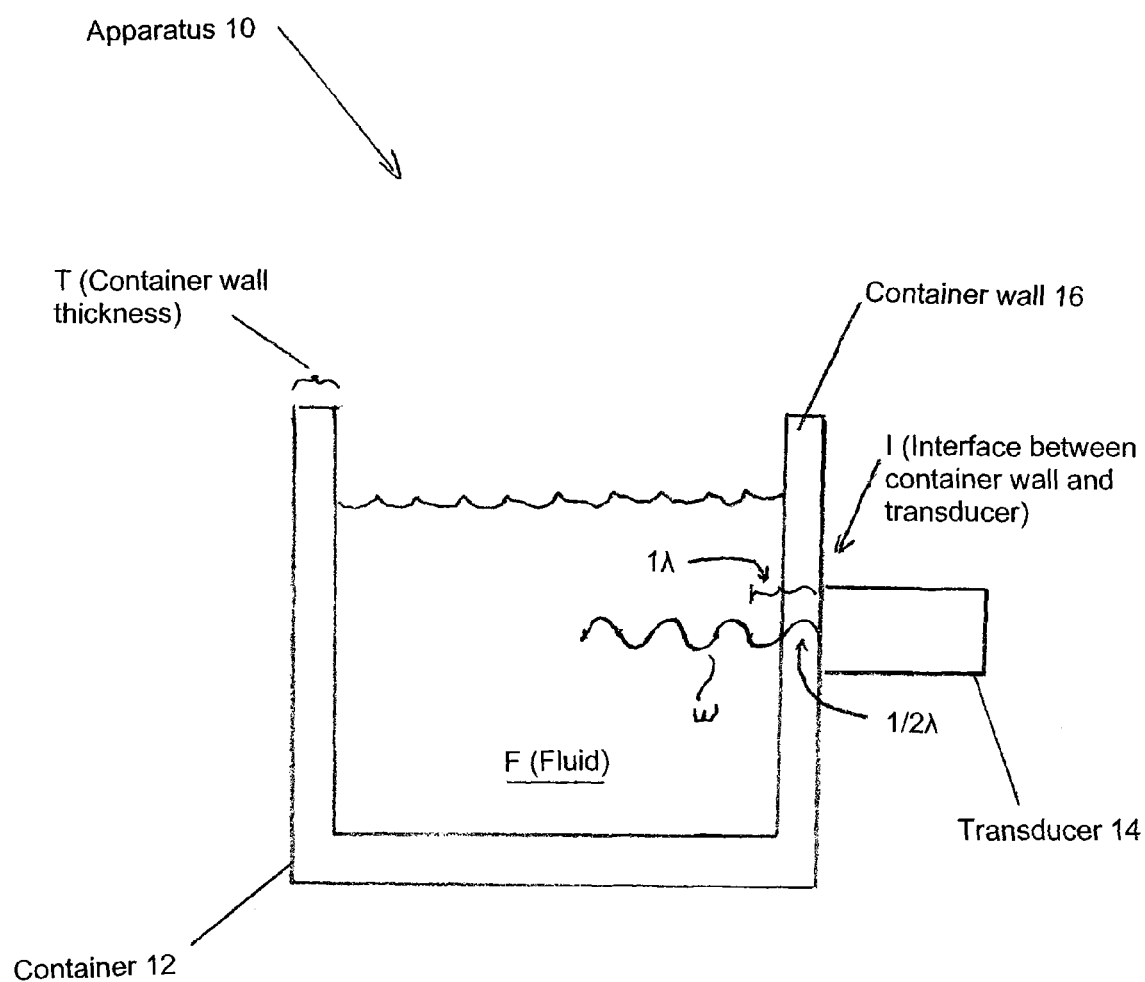

OPTIMIZING ACOUSTIC EFFICIENCY OF A SONIC FILTER OR SEPARATOR

CROSS-REFERENCE TO RELATED APPLICATIONS

This application corresponds international patent application serial no. PCT/US2012/023960, filed 6 Feb. 2012, which claims benefit to provisional patent application Ser. No. 61/439,540, filed 4 Feb. 2011, which is incorporated by reference in its entirety.

BACKGROUND OF THE INVENTION

1. Field of Invention

The present invention relates to a technique for providing a standing wave into fluid in a container.

2. Description of Related Art

Sonic filters and separators based upon standing wave agglomeration are known and have been demonstrated. The efficiency of such filters is determined by the amount of electrical energy required to obtain a specified level of separation.

Typically, a standing wave may be set up in a fluid by acoustically driving the fluid by situating an appropriate transducer to the outside of the container containing the fluid. However, one problem with this type of configuration is that the interface between the fluid and the container wall causes back reflections (toward the transducer) due to the mismatch in acoustic impedance between the container wall and the fluid. This reflection results in less acoustic energy being imparted to the fluid. Because of this, the maximum amount of energy is not delivered to the fluid, thus reducing the operating efficiency thereof.

There is a need to improve the efficiency of such filters, e.g., by lowering the required acoustic drive power.

There is also a need in the industry to improve the maximum amount of energy delivered to the fluid, thus improving the operating efficiency of these types of devices and processes.

SUMMARY OF THE INVENTION

The present invention provides for a proper selection of the thickness and/or material to ensure that a ½ wavelength of a desired frequency exists within the container wall. Under these conditions, a maximum amount of energy is delivered to the fluid, thus improving the operating efficiency.

The present invention also provides an improved excitation method to improve the efficiency by lowering the required acoustic drive power.

According to some embodiments, the present invention may take the form of apparatus featuring a container and a transducer. The container has a container wall characterized by at least one parameter, including being made of a selected type of material or having a selected thickness, and is configured to hold a fluid therein. The transducer is configured on the outside of the container wall, and is also configured to provide a standing wave into the fluid. The at least one parameter of the container wall is selected to ensure about a ½ wavelength of a desired frequency exists within the container wall, so as to substantially reduce back reflections toward the transducer due to any mismatch in acoustic impedance at the interface between the container wall and the fluid, and so as to substantially maximize the amount of energy delivered to the fluid, thus improving the operating efficiency of the apparatus.

According to some embodiments, the present invention may also include some combination of the following features:

The at least one parameter may include a combination of the selected material and the selected thickness of the container wall.

The container wall may be a steel plate

The container wall may have a thickness of about ¾".

The transducer may be configured to provide the standing wave into the fluid with a sound speed in the steel plate of about 5,740 meters/sec, so as to produce a first ½ wave resonance at about 150.7 KHz, a second resonance (first full wave) at about 301.4 KHz, and a third resonance at about 452.1 KHz.

The apparatus may include, or take the form of, a sonic filter or separator.

BRIEF DESCRIPTION OF THE DRAWING

The drawing includes FIG. 1, which is not necessarily drawn to scale, and which is a diagram showing apparatus according to some embodiments of the present invention.

DETAILED DESCRIPTION OF BEST MODE OF THE INVENTION

By way of example, FIG. 1 shows the present invention in the form of apparatus generally indicated as 10 featuring a container 12 in combination with a transducer 14. The container 12 has a container wall 16 characterized by at least one parameter, including being made of a selected type of material or having a selected thickness T. The container 12 is configured to hold a fluid F therein. The transducer 14 is configured on the outside of the container wall 16, and is also configured to provide a standing wave W into the fluid F.

The at least one parameter of the container wall 16 is selected to ensure about a ½ wavelength (½λ) of a desired frequency exists within the container wall 16, so as to substantially reduce back reflections toward the transducer 14 due to any mismatch in acoustic impedance at the interface I between the container wall 16 and the fluid F, and so as to substantially maximize the amount of energy delivered to the fluid F, thus improving the operating efficiency of the apparatus 10.

According to some embodiments of the present invention, the at least one parameter may be a combination of the selected material and the selected thickness T of the container wall 16.

According to some embodiments of the present invention, the container wall 16 may be a steel plate and/or the container wall 16 may have a thickness of about ¾".

According to some embodiments of the present invention, the transducer 14 may be configured to provide the standing wave W into the fluid F with a sound speed in the steel plate of about 5,740 meters/sec, so as to produce a first ½ wave resonance at about 150.7 KHz, a second resonance (first full wave) at about 301.4 KHz, and a third resonance at about 452.1 KHz.

According to some embodiments of the present invention, the apparatus 10 may be, or form part of, a sonic filter or separator.

Containers like element 12 are known in the art, and the scope of the invention is not intended to be limited to any particular type or kind thereof either now known or later developed in the future. By way of example, the container may include, or take the form of, a flotation tank, a column, a drum, a tube, a vat, etc.

Transducers like element 14 are known in the art, and the scope of the invention is not intended to be limited to any particular type or kind thereof either now known or later developed in the future.

The scope of the invention is not intended to be limited to the calculated values of the at least one parameters set forth above by way of example. Embodiments are envisioned using other types or kinds of selected materials either now known or later developed in the future, other types or kinds of selected container wall thicknesses either now known or later developed in the future, as well as other types or kinds of combinations of selected materials and selected container wall thicknesses either now known or later developed in the future.

Applications Re Other Industrial Processes

By way of example, in known industrial processes sound passing through a fluid, mixture, gas/vapor of a process flow, e.g. in a pipe or container, may be sensed and used to determine parameters related to the fluid, mixture, gas/vapor. The sound may be generated by equipment operating either in association with the process flow or in close proximity to the process flow. The sound generated by equipment operating in association with the process flow may include sound in the form of a standing wave generated by such an appropriate transducer or other known sound generating device that is coupled or connected, e.g., to the outside of a container wall of a container, a pipe wall of a pipe, a tank wall of a tank, etc. See, e.g., the technology disclosed in PCT patent application serial no. PCT/US/27731, filed 9 Mar. 2011 (Atty docket no. 712-2.338-1 (CCS 33, 35, 40, 45-49)), entitled "Method and apparatus for determining GVF (gas volume fraction) for aerated fluids and liquids in flotation tanks, columns, drums, tubes, vats," which has been assigned to the assignee of the present application, and which is hereby incorporated by reference in its entirety.

Further, the present invention also may be used in, or form part of, or used in conjunction with, SONAR-based entrained air meter and metering technology known in the art taking the form of a SONAR-based meter disclosed, e.g., in whole or in part in U.S. Pat. Nos. 7,165,464; 7,134,320; 7,363,800; 7,367,240; and 7,343,820.

Furthermore, the present invention may also be used in, or form part of, or used in conjunction with, industrial processes like a mineral extraction processing system for extracting minerals from ore either now known or later developed in the future, including any mineral process, such as those related to processing substances or compounds that result from inorganic processes of nature and/or that are mined from the ground, as well as including either other extraction processing systems or other industrial processes, where the sorting, or classification, of product by size is critical to overall industrial process performance.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus comprising:
    a container having a container wall characterized by a combination of both, being made of a selected type of material and having a selected thickness, the container being configured to hold a fluid therein;
    a transducer configured on the outside of the container wall, and also configured to provide a standing wave having a wavelength with a desired frequency into the fluid;
    the at least one parameter of the container wall being selected to ensure about a ½ wavelength of the desired frequency exists within the container wall, so as to substantially reduce back reflections toward the transducer due to any mismatch in acoustic impedance at the interface between the container wall and the fluid, and so as to substantially maximize the amount of energy delivered to the fluid, thus improving the operating efficiency of the apparatus;
    wherein the container wall is a steel plate having a thickness of about ¾"; and
    wherein the transducer is configured to provide the standing wave into the fluid with a sound speed in the steel plate of about 5,740 meters/sec, so as to produce a first ½ wave resonance at about 150.7 KHz, a second resonance (first full wave) at about 301.4 KHz, and a third resonance produced at about 452.1 KHz.

2. The apparatus according to claim 1, wherein the apparatus is a sonic filter or separator.

* * * * *